United States Patent
Lyon et al.

(10) Patent No.: US 6,865,137 B2
(45) Date of Patent: Mar. 8, 2005

(54) METHOD FOR PULSE OFFSET CALIBRATION IN TIME OF FLIGHT RANGING SYSTEMS

(75) Inventors: Quinton Lyon, Peterborough (CA); Perry Dirkx, Peterborough (CA)

(73) Assignee: Siemens Milltronics Process Instruments, Inc., Ontario (CA)

( * ) Notice: Subject to any disclaimer, the term of this patent is extended or adjusted under 35 U.S.C. 154(b) by 0 days.

(21) Appl. No.: 10/603,718

(22) Filed: Jun. 26, 2003

(65) Prior Publication Data

US 2004/0076079 A1 Apr. 22, 2004

(30) Foreign Application Priority Data

Jun. 27, 2002 (CA) ............................................. 2392062

(51) Int. Cl.$^7$ .............................................. G01S 15/08
(52) U.S. Cl. ........................... 367/13; 367/99; 367/908; 73/290 V
(58) Field of Search ............................ 367/13, 99, 908; 73/290 V

(56) References Cited

U.S. PATENT DOCUMENTS 5,319,974 A * 6/1994 Lenz et al. .................... 367/99
5,755,136 A * 5/1998 Getman et al. ........... 73/290 V

* cited by examiner

Primary Examiner—Ian J. Lobo
(74) Attorney, Agent, or Firm—Harness, Dickey & Pierce, P.L.C.

(57) ABSTRACT

A pulse offset calibration method for a pulse-echo level measurement system. The pulse-echo level measurement system includes a transducer for transmitting calibration acoustic pulses and receiving echo pulses. A receiver converts the echo pulses into corresponding pulse profile signals having a leading edge. A static delay interval is defined on the leading edge corresponding to the time interval between the reception of the echo pulse and the response by the receiver. A dynamic delay interval is defined on the leading edge corresponding to the time response characteristics of the transducer and the receiver. The static delay interval and the dynamic delay interval are summed to determine the offset time interval for the echo pulse. The offset time interval is subtracted from the measurements to provide the true duration for the time of flight.

26 Claims, 4 Drawing Sheets

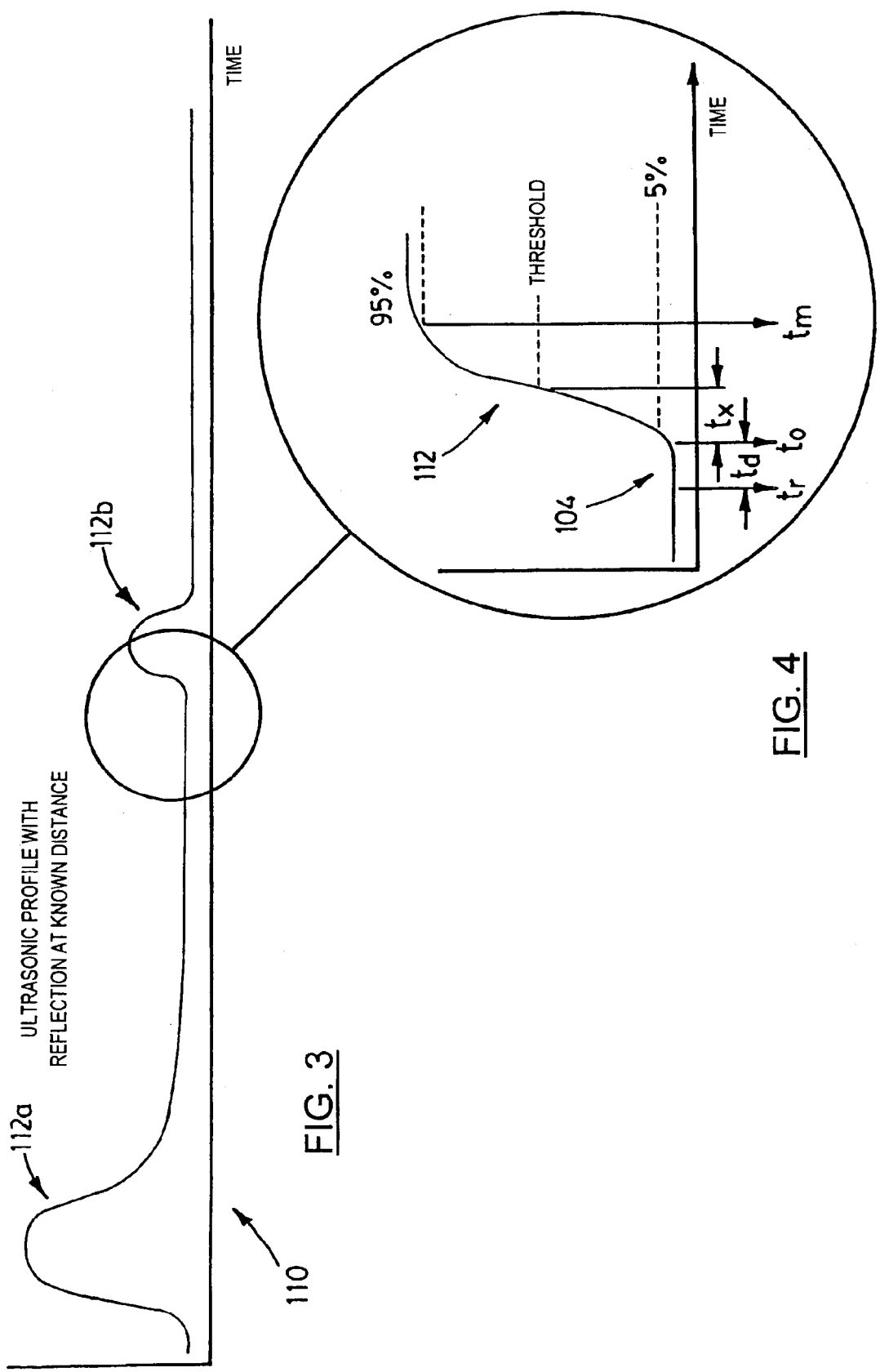

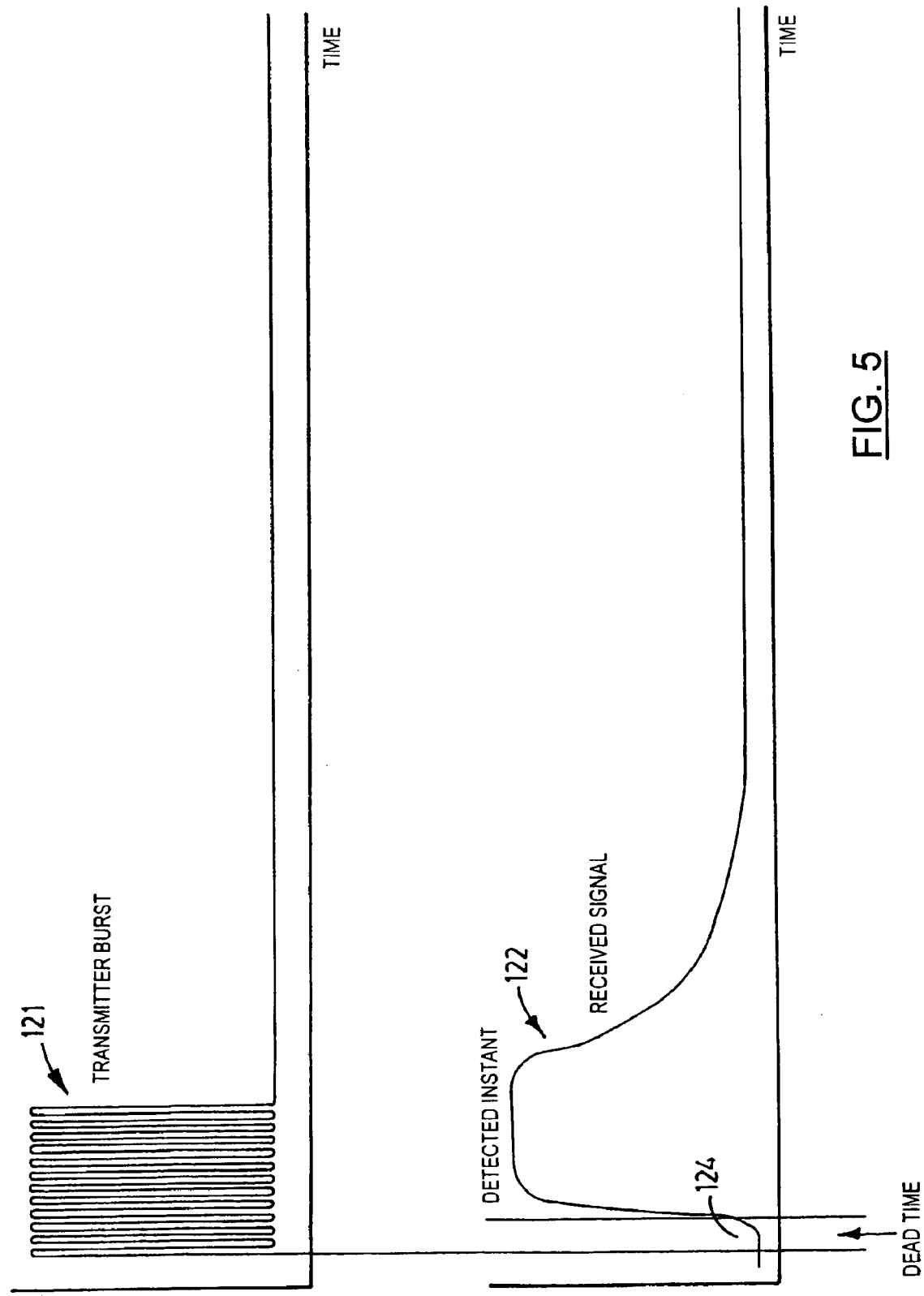

METHOD FOR PULSE OFFSET CALIBRATION IN TIME OF FLIGHT RANGING SYSTEMS

FIELD OF THE INVENTION

The present invention relates to level measurement systems, and more particularly to a method for pulse offset calibration in pulse-echo acoustic ranging and time of flight ranging systems.

BACKGROUND OF THE INVENTION

Pulse-echo acoustic ranging systems are widely used to recognize the presence of an object by measuring the time interval between the transmission of sonic or electromagnetic pulse towards the object and the reception of reflected echo signals over a distance. Systems of this kind generally have a transducer serving the dual role of transmitting and receiving pulses, and a signal processor for detecting and calculating the position or range of the object based on the transit times of the transmitted and reflected signals.

The transducer employed in a pulse-echo ranging system typically includes an electro-mechanical vibrating element that functions as both a transmitter and a receiver. Using the same transducer for transmitting as well as receiving is advantageous because the transducer will exhibit the same resonance frequency and the same directional characteristics in both transmit and receive modes. In transmit mode, the transducer is excited with an input voltage signal, which results in the emission of a characteristic burst of electromagnetic, i.e. acoustic, energy. In receive mode, the reflected energy or echo pulse causes the resonator element to vibrate and generate a low amplitude electrical signal output.

A primary problem in pulse-echo ranging systems is the susceptibility of the transducer to decay or "ringing down" oscillations of the resonator element as a result of stored energy being released by the transducer after excitation. The ringing down problem tends to severely limit the sensitivity of the transducer to detect a true or actual echo pulse. This loss in sensitivity is particularly acute when the echo pulse has a low amplitude relative to the ring down pulses of the transducer, and also when the reflective surface (i.e. object) is close to the transducer.

Furthermore, during echo pulse detection, there is a finite time delay between the arrival of the echo pulse and the detection of the echo pulse by the resonator element. The effect of this delay known as "ringing up" is to increase the receiver dead time which results in the receive pulse being longer in time than optimally required. The time delay needs to be taken into account in calculating the transit time of the pulse echo signal.

In order to provide accurate readings, the pulse-echo ranging system needs to know the delay between the echo pulse being received and the detection of the echo pulse as an output signal. Accordingly, there remains a need for improved pulse offset calibration techniques in pulse-echo acoustic ranging systems.

BRIEF SUMMARY OF THE INVENTION

The present invention provides a method for calibrating the pulse offset in the return echo signal in level measurement systems.

In a first aspect, the present invention provides a method for calibrating an offset for receive echo pulses in a pulse echo level measurement system, the level measurement system has a transducer for transmitting and receiving echo pulses and includes a receiver for converting the receive pulses into corresponding pulse profile signals, the method comprises the steps of: (a) transmitting a transmit pulse to a reflective surface; (b) receiving an echo pulse corresponding to the transmit pulse reflected by the reflective surface; (c) converting the echo pulse into a pulse profile signal having a leading edge; (d) defining a first delay interval on the leading edge, said first delay interval corresponding to the time interval between in the reception of the echo pulse and the response by the receiver; (e) defining a second delay interval corresponding to the time interval for the leading edge of the pulse profile signal to reach a threshold level.

In a further aspect, the present invention provides a pulse-echo acoustic ranging system which comprises: (a) a transducer for emitting acoustic pulses and detecting reflected acoustic pulses; (b) a controller having a receiver component and a transmitter component; (c) the transducer having an input port operatively coupled to the transmitter component and being responsive to the transmitter component for emitting the acoustic pulses, and the transducer including an output port operatively coupled to the receiver component for outputting reflected acoustic pulses coupled by the transducer; (d) the receiver component converting the reflected acoustic pulses into pulse profile signals, the pulse profile signals having a leading edge and an amplitude; (e) the controller including a program component for defining a first delay interval on the leading edge, the first delay interval corresponding to the time interval between the arrival of the reflected acoustic pulse and the response by the receiver, and another program component for defining a second delay interval corresponding to the time interval for the leading edge of the pulse profile signal to reach a threshold level, and a program component for summing the first delay interval and the second delay interval to define an offset interval for the reflected acoustic pulse.

In yet another aspect, the present invention provides a method for calibrating an offset interval for receive echo pulses in a pulse echo level measurement system, the level measurement system has a transducer for transmitting and receiving echo pulses and includes a receiver for converting the receive pulses into corresponding pulse profile signals, the method comprises the steps of: (a) transmitting a transmit pulse to a reflective surface; (b) receiving an echo pulse corresponding to the transmit pulse reflected by the reflective surface; (c) converting the echo pulse into a pulse profile signal having a leading edge; (d) determining a function describing the leading edge of the pulse profile signal: (e) using the function to calculate a first delay interval on the leading edge, the first delay interval corresponding to the time interval between in the reception of the echo pulse and the response by the receiver; (e) using the function to calculate a second delay interval corresponding to the time interval for the leading edge of the pulse profile signal to reach a threshold level; (f) summing the first delay interval and the second delay interval to determine the offset interval for the echo pulse.

In a further aspect, the present invention provides a method for calibrating an offset interval for receive echo pulses in a pulse-echo level measurement system, said level measurement system having a transducer for transmitting and receiving echo pulses and including a receiver for converting the receive pulses into corresponding pulse profile signals, the method comprises the steps of: (a) transmitting a transmit pulse to a reflective surface; (b) receiving an echo pulse corresponding to the transmit pulse reflected by the reflective surface; (c) converting the echo pulse into a pulse profile signal having a leading edge; (d) defining a static delay interval on the leading edge, the first delay interval corresponding to the time interval between in the reception of the echo pulse and the response by the receiver; (e) defining a dynamic delay interval corresponding to the time interval for the leading edge of the pulse profile signal to reach a threshold level; (f) summing the static delay interval and the dynamic delay interval to determine the offset interval for the echo pulse.

In another aspect, the present invention provides a pulse-echo acoustic ranging system comprising: a transducer for emitting acoustic pulses and detecting reflected acoustic pulses; a controller having a receiver component and a transmitter component; the transducer having an input port operatively coupled to the transmitter component and being responsive to the transmitter component for emitting the acoustic pulses, and the transducer including an output port operatively coupled to the receiver component for outputting reflected acoustic pulses coupled by the transducer; the receiver component converting the reflected acoustic pulses into pulse profile signals, the pulse profile signals having a leading edge and an amplitude; the controller including a program component for defining a static delay interval on the leading edge corresponding to the time interval between the arrival of the reflected acoustic pulse and the response by the receiver, and another program component for defining a dynamic delay interval corresponding to the time interval for the leading edge of the pulse profile signal to reach a threshold level, and a program component for summing the static delay interval and the dynamic delay interval to define an offset interval for the reflected acoustic pulse.

In another aspect, the present invention provides a pulse-echo acoustic ranging system comprising: transceiver means for transmitting acoustic pulses and receiving reflected acoustic pulses; pulse generating means for generating acoustic pulses, the pulse generating means being operatively coupled to the transceiver means for launching an incident acoustic pulse towards a target; pulse detection means operatively coupled to the transceiver means for detecting a reflected acoustic signal corresponding to the incident acoustic pulse bouncing off the target, and means for converting the reflected acoustic signal into a pulse profile signal having a leading edge and an amplitude; and pulse analysis means for defining a first delay interval in the leading edge of the pulse profile signal corresponding to a time interval between the arrival of the reflected acoustic pulse and a response delay by the pulse detection means, the pulse analysis means further defining a second delay interval corresponding to the time interval for the leading edge of the pulse profile signal to reach a threshold level, wherein the first delay interval and the second delay interval together define an offset interval for the reflected acoustic pulse.

Other aspects and features of the present invention will become apparent to those ordinarily skilled in the art upon review of the following description of specific embodiments of the invention in conjunction with the accompanying drawings.

BRIEF DESCRIPTION OF THE DRAWINGS

Reference will now be made to the accompanying drawings, which show, by way of example, an embodiment of the present invention, and in which:

FIG. 3 shows in diagrammatic form an ultrasonic pulse profile for a reflection surface at a known distance;

FIG. 4 shows in diagrammatic form detection of the reflected echo pulse of FIG. 3 in more detail; and FIG. 5 shows in diagrammatic form calibration of the offset between the transmit pulse burst and the received echo pulse in accordance with the present invention.

DETAILED DESCRIPTION OF THE EMBODIMENT

Figure 1:
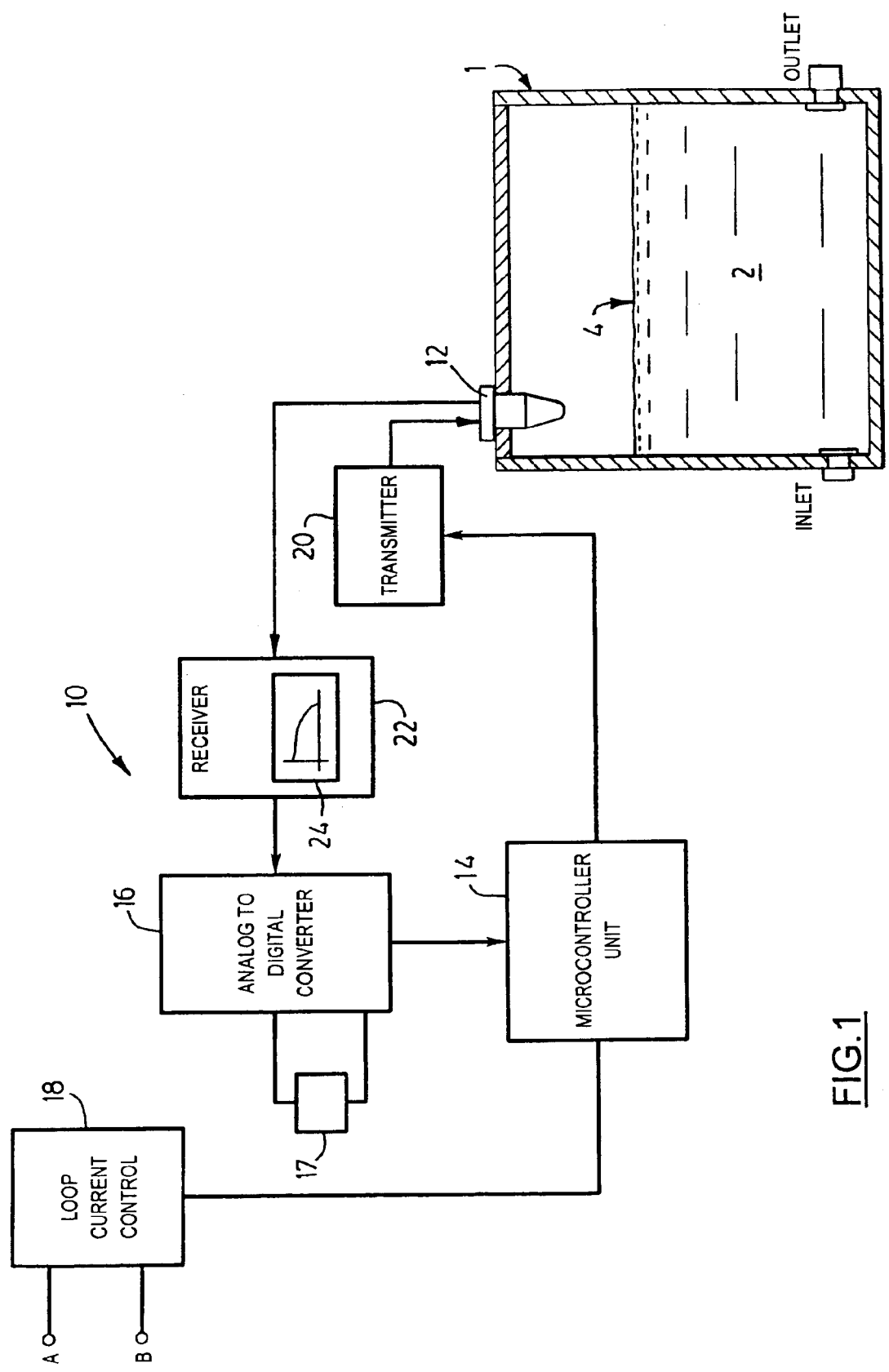
FIG. 1 shows in diagrammatic form a pulse-echo acoustic ranging device utilizing a pulse offset calibration technique according to the present invention.

Reference is first made to FIG. 1, which shows in diagrammatic form an ultrasonic pulse-echo acoustic ranging device 10 utilizing a pulse offset calibration mechanism according to the present invention.

Figure 2:
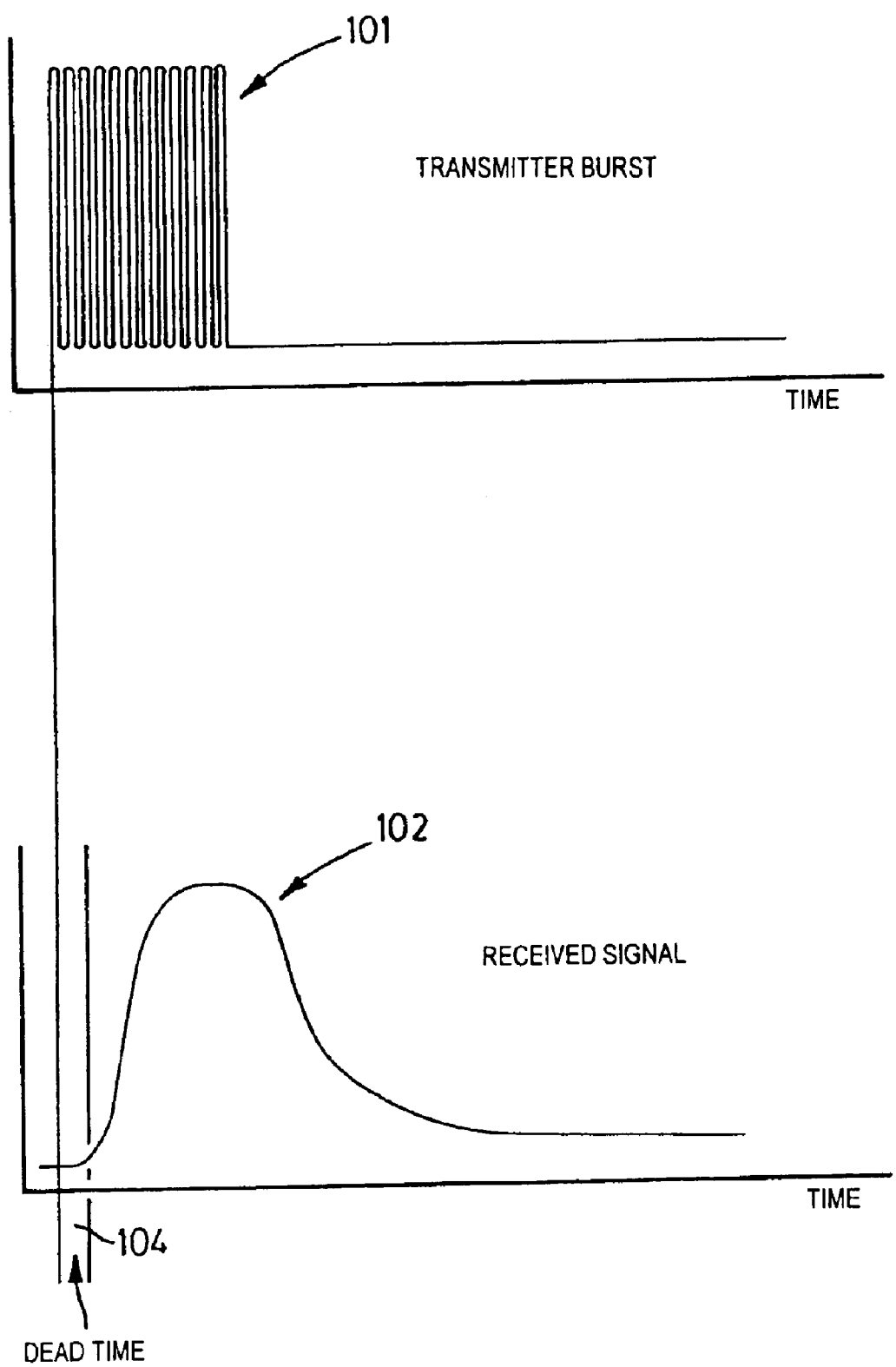
FIG. 2 shows in diagrammatic form the dead time between a transmitter pulse burst and a received echo pulse in a time of flight ranging device or a pulse-echo acoustic ranging system.

As shown in FIG. 1, the pulse-echo acoustic ranging device 10 comprises an ultrasonic transducer 12, a microcontroller unit 14, an analog-to-digital converter 16, and current (4–20 mA) loop interface module 18. The transducer 12 is coupled to the microcontroller unit 14 through a transmitter 20. The microcontroller unit 14 uses the transmitter 20 to excite the transducer 12 to emit ultrasonic pulses 101 as shown in FIG. 2. A reflected or echo pulse 102 (FIG. 2) is coupled by the transducer 12 and converted into an electrical signal in a receiver 22.

The ultrasonic pulse-echo ranging device 10, i.e. the ultrasonic transducer 12, is installed in a tank 1 containing a liquid 2, or other type of material, with a level determined by the top surface of the liquid 2. The top surface of the liquid 2 provides a reflective surface or reflector, indicated by reference 4, which reflects the ultrasonic pulses 101 (FIG. 2) generated from the emitter on the transducer 12. In calibration mode, a good reflective surface, such as a wall at a known distance may be used. The reflected ultrasonic pulses 102 (FIG. 2) are coupled by the transducer 12 and converted by the receiver 22 into electrical signals. The received echo pulse 102 is sampled and digitized by the A/D converter 16 for further processing by the microcontroller unit 14. The microcontroller unit 14 executes an algorithm which identifies and verifies the echo pulse 102 and calculates the range of the reflective surface 4, i.e. the time it takes for the reflected ultrasonic pulse, i.e. echo pulse 102, to travel from the reflective surface 4 to the receiver on the transducer 12. From this calculation, the distance to the surface of the liquid 4 and thereby the level of the liquid is determined. The microcontroller 14 also controls the transmission of data and control signals through the current loop interface 18. The microcontroller 14 is suitably programmed to perform these operations as will be within the understanding of those skilled in the art.

As shown in FIG. 2, there is a time interval or dead time indicated by reference 104 which corresponds to the delay between the reflected ultrasonic pulse 102 being received by the transducer 12 (FIG. 1) and being converted by the receiver 22 (FIG. 1) into an output signal by the receiver 22. In order to provide accurate level measurement readings the dead time needs to be known.

To determine the dead time in accordance with the present invention, an ultrasonic receive echo profile 110 as shown in FIG. 3 is generated by transmitting pulses 101 (FIG. 2) to a calibration target. The calibration target comprises a reflective surface positioned at a known distance from the transducer 12 (FIG. 1). The ultrasonic receive echo profile 110 is characterized by a series of echo pulses 112, indicated individually by 112a and 112b, corresponding to the transmit pulses 101 reflected by the calibration target, for example, a wall or other suitable reflective surface located at a known or predetermined distance. The pulses 101 for generating the ultrasonic receive echo profile 110 are transmitted using a calibration function in the firmware for the microcontroller unit 14 (FIG. 1).

Reference is next made to FIG. 3, which shows in more detail the echo pulse 112 for the ultrasonic receive echo profile 110 and a method for determining the dead time according to the present invention. As shown in FIG. 4, the leading edge of the echo pulse 112 is defined by an arrival time $t_r$, a receiver response time $t_o$, a dynamic delay time $t_x$, and a maximum delay time $t_m$. The arrival time $t_r$ corresponds to the point in time when the echo pulse 112 actually arrives at the transducer 12 (FIG. 1). The arrival time $t_r$ is a known entity because the speed of sound in air (corrected for temperature) is known, as is the distance to the calibration target. The arrival time $t_r$ is calculated as $t_r$=distance/velocity. The receiver response time $t_o$ corresponds to the instant when the receiver 22 (FIG. 1) starts responding, i.e. an output signal corresponding to the received echo pulse 112 is generated. The dynamic delay time $t_x$ corresponds to a time delay value that depends on response characteristic of the receiver 22 and the transducer 12 (FIG. 1) and a selected threshold percentage. The maximum delay time $t_m$ corresponds to the maximum delay in the receiver 22. The dynamic delay time $t_x$ is selected as a threshold percentage or fraction of the maximum delay time $t_m$ as described in more detail below with reference to FIG. 3.

Referring still to FIG. 4, the dead time $t_d$ is determined as follows:

$$t_d = t_o - t_x$$

The dead time $t_d$ corresponds to the time delay between the arrival of the echo pulse 112 and when the receiver 22 started to respond. According to this aspect of the invention, the receiver response time $t_o$ is taken at a 5% point on the leading edge of the echo pulse 112, and the maximum delay time $t_m$ is taken at a 95% point on the leading edge of the echo pulse 112. The dead time $t_d$ is the calculated dead time between when the reflected pulse, i.e. sound, actually arrived at the receiver 22 and when the receiver 22 started responding. The other timing point is the dynamic delay time $t_x$. The delay time $t_x$ is taken at a point between $t_o$ and $t_m$, for example in this case, at the 50% level, and the delay time $t_x$ is determined as follows:

$$t_x = (t_m - t_o) \times \text{threshold level (e.g. 50\%)}$$

The total error, i.e. the delay between the arrival of the echo pulse 112 and the start of the response by the receiver 22 is given by summing the dead time $t_d$ and the dynamic delay time $t_x$ as follows:

$$t_d + t_x$$

The calculated total error is indicated by reference 124 in FIG. 5. The total error ($t_d+t_x$) corresponding to the delay in the receiver response is subtracted from all the measurement values generated by the system 10 in order to provide the true time of flight time for the echo pulses 102.

In one embodiment, the transmit pulses 101 are generated or transmitted in a calibration mode (i.e. CAL mode) of operation for the level measurement system 10 (i.e. implemented in the firmware for the microcontroller unit 14) with a signal level of 65 dB. Advantageously, this results in an echo pulse in the receiver 22 and little or no echoes, thereby allowing the receiver response time $t_o$ to be measured. It will be appreciated that the dynamic delay cannot be determined because the "ringing up" of the transducer is not taken into account. However, it should be appreciated that the ringing up may be ignored where the bandwidth of the receiver 22 is significantly less than the transducer, and as such rings up (and down) more slowly.

In accordance with a second embodiment of the invention, the leading edge of the echo pulse 112 is represented by a best fit curve. The best fit curve is calculated for the leading edge for example as a $3^{rd}$ order polynomial. By using a best fit curve, the 5% and 95% percentage points can be accurately calculated and are not prone to errors arising from possible inconsistencies at the start and end of the leading edge. However, it will be appreciated that implementation of a best fit curve places additional computational requirements on the microcontroller unit 14 (FIG. 1), as such may not be suitable for low power applications.

The present invention may be embodied in other specific forms without departing from the spirit or essential characteristics thereof. Certain adaptations and modifications of the invention will be obvious to those skilled in the art. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. A method for calibrating an offset interval for received echo pulses in a pulse echo level measurement system, said level measurement system having a transducer for transmitting and receiving echo pulses and including a receiver for converting the received pulses into corresponding pulse profile signals, said method comprising the steps of:
    (a) transmitting a transmit pulse to a reflective surface;
    (b) receiving an echo pulse corresponding to the transmit pulse reflected by the reflective surface;
    (c) converting the echo pulse into a pulse profile signal having a leading edge;
    (d) defining a first delay interval on the leading edge, said first delay interval corresponding to a time interval between the reception of the echo pulse and the response by the receiver;
    (e) defining a second delay interval corresponding to a time interval for the leading edge of the pulse profile signal to reach a threshold level; and
    (f) summing said first delay interval and said second delay interval to determine the offset interval for the echo pulse;
    wherein said offset interval is subtracted from subsequent measurements of the pulse echo level measurement system so as to provide true measurements.

2. The method as claimed in claim 1, wherein said first delay interval is defined at a first threshold level on the leading edge of the pulse profile signal.

3. The method as claimed in claim 2, wherein said second delay interval is defined at a second threshold level on the leading edge of the pulse profile signal.

4. The method as claimed in claim 2, wherein said first threshold level comprises 5% of the amplitude of the pulse profile signal.

5. The method as claimed in claim 3, wherein said second threshold level comprises a midway point on the leading edge of the pulse profile signal.

6. The method as claimed in claim 1, wherein said transmit pulse comprises a calibration transmit pulse having a known characteristic, and said reflective surface is located at a predetermined distance from the transducer.

7. A pulse-echo acoustic ranging system comprising:
(a) a transducer for emitting acoustic pulses and detecting reflected acoustic pulses;
(b) a controller having a receiver component and a transmitter component;
(c) said transducer having an input port operatively coupled to said transmitter component and being responsive to said transmitter component for emitting said acoustic pulses, and said transducer including an output port operatively coupled to said receiver component for outputting reflected acoustic pulses coupled by said transducer;
(d) said receiver component converting said reflected acoustic pulses into pulse profile signals, said pulse profile signals having a leading edge and an amplitude; and
(e) said controller including a program component for defining a first delay interval on the leading edge, said first delay interval corresponding to the time interval between the arrival of the reflected acoustic pulse and the response by the receiver, and another program component for defining a second delay interval corresponding to the time interval for the leading edge of the pulse profile signal to reach a threshold level, and a program component for summing said first delay interval and said second delay interval to define an offset interval for the reflected acoustic pulse.

8. The pulse-echo acoustic ranging system as claimed in claim 7, wherein said first delay interval is defined at a first threshold level on the leading edge of the pulse profile signal.

9. The pulse-echo acoustic ranging system as claimed in claim 8, wherein said second delay interval is defined at a second threshold level on the leading edge of the pulse profile signal.

10. A method for calibrating an offset interval for received echo pulses in a pulse echo level measurement system, said level measurement system having a transducer for transmitting and receiving echo pulses and including a receiver for converting the received pulses into corresponding pulse profile signals, said method comprising the steps of:
(a) transmitting a transmit pulse to a reflective surface;
(b) receiving an echo pulse corresponding to said transmit pulse reflected by the reflective surface;
(c) converting said echo pulse into a pulse profile signal having a leading edge;
(d) determining a function describing the leading edge of said pulse profile signal;
(e) using said function to calculate a first delay interval on said leading edge, said first delay interval corresponding to a time interval between the reception of said echo pulse and a response by the receiver;
(f) using said function to calculate a second delay interval corresponding to a time interval for the leading edge of said pulse profile signal to reach a threshold level; and
(g) summing said first delay interval and said second delay interval to determine the offset interval for the echo pulse;
wherein said offset interval is subtracted from subsequent measurements of the pulse echo level measurement system so as to provide true measurements.

11. The method as claimed in claim 10, wherein said first delay interval is defined at a first threshold level on the leading edge of said pulse profile signal.

12. The method as claimed in claim 11, wherein said second delay interval is defined at a second threshold level on the leading edge of said pulse profile signal.

13. The method as claimed in claim 11, wherein said first threshold level comprises 5% of the amplitude of said pulse profile signal.

14. The method as claimed in claim 12, wherein said second threshold level comprises a midway point on the leading edge of said pulse profile signal.

15. A method for calibrating an offset interval for received echo pulses in a pulse-echo level measurement system, said level measurement system having a transducer for transmitting and receiving echo pulses and including a receiver for converting the received pulses into corresponding pulse profile signals, said method comprising the steps of:
(a) transmitting a transmit pulse to a reflective surface;
(b) receiving an echo pulse corresponding to said transmit pulse reflected by said reflective surface;
(c) converting said echo pulse into a pulse profile signal having a leading edge;
(d) defining a static delay interval on said leading edge, said static delay interval corresponding to a time interval between the reception of said echo pulse and a response by the receiver;
(e) defining a dynamic delay interval corresponding to a time interval for the leading edge of said pulse profile signal to reach a threshold level; and
(f) summing said static delay interval and said dynamic delay interval to determine the offset interval for said echo pulse;
wherein said offset interval is subtracted from subsequent measurements of the pulse echo level measurement system so as to provide true measurements.

16. The method as claimed in claim 15, wherein said dynamic delay interval is defined according to the response characteristic of the transducer.

17. The method as claimed in claim 16, wherein said dynamic delay interval is further defined according to the response characteristic of the receiver.

18. The method as claimed in claim 15, wherein said transmit pulse comprises a calibration transmit pulse having a known characteristic, and said reflective surface is located at a predetermined distance from the transducer.

19. A pulse-echo acoustic ranging system comprising:
a transducer for emitting acoustic pulses and detecting reflected acoustic pulses;
a controller having a receiver component and a transmitter component;
said transducer having an input port operatively coupled to said transmitter component and being responsive to said transmitter component for emitting said acoustic pulses, and said transducer including an output port operatively coupled to said receiver component for outputting reflected acoustic pulses coupled by said transducer;
said receiver component converting said reflected acoustic pulses into pulse profile signals, said pulse profile signals having a leading edge and an amplitude; and
said controller including a program component for defining a static delay interval on the leading edge corresponding to the time interval between the arrival of the reflected acoustic pulse and the response by the receiver, and another program component for defining a dynamic delay interval corresponding to the time interval for the leading edge of the pulse profile signal to reach a threshold level, and a program component for summing said static delay interval and said dynamic delay interval to define an offset interval for the reflected acoustic pulse.

20. A pulse-echo acoustic ranging system comprising:

transceiver means for transmitting acoustic pulses and receiving reflected acoustic pulses;

pulse generating means for generating acoustic pulses, said pulse generating means being operatively coupled to said transceiver means for launching an incident acoustic pulse towards a target;

pulse detection means operatively coupled to said transceiver means for detecting a reflected acoustic signal corresponding to said incident acoustic pulse bouncing off said target, and means for converting said reflected acoustic signal into a pulse profile signal having a leading edge and an amplitude; and pulse analysis means for defining a first delay interval in said leading edge of said pulse profile signal corresponding to a time interval between the arrival of said reflected acoustic pulse and a response delay by the pulse detection means, said pulse analysis means further defining a second delay interval corresponding to a time interval for the leading edge of said pulse profile signal to reach a threshold level, wherein said first delay interval and said second delay interval together define an offset interval for said reflected acoustic pulse.

21. The pulse-echo acoustic ranging system as claimed in claim 20, wherein said first delay interval is defined at a first threshold level on the leading edge of said pulse profile signal.

22. The pulse-echo acoustic ranging system as claimed in claim 21, wherein said second delay interval is defined at a second threshold level on the leading edge of said pulse profile signal.

23. The pulse-echo acoustic ranging system as claimed in claim 21, wherein said first threshold level comprises 5% of the amplitude of said pulse profile signal.

24. The pulse-echo acoustic ranging system as claimed in claim 20, wherein said pulse analysis means further includes extrapolation means for defining a function describing the leading edge of said pulse profile signal.

25. The pulse-echo acoustic ranging system as claimed in claim 24, wherein said first delay interval is determined based on said function.

26. The pulse-echo acoustic ranging system as claimed in claim 24, wherein said second delay interval is determined based on said function.

* * * * *